(12) United States Patent
Burdick et al.

(10) Patent No.: US 8,214,369 B2
(45) Date of Patent: Jul. 3, 2012

(54) SYSTEM AND METHOD FOR INDEXING AND PREFILTERING

(75) Inventors: Brian Burdick, Bellevue, WA (US); Joshua J. Forman, Somerville, MA (US); Kevin P. Kornelson, Redmond, WA (US); Murali Vajjiravel, Sammamish, WA (US); Rajeev Prasad, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1355 days.

(21) Appl. No.: 11/007,247

(22) Filed: Dec. 9, 2004

(65) Prior Publication Data

US 2006/0129555 A1 Jun. 15, 2006

(51) Int. Cl.
*G06F 7/00* (2006.01)
*G06F 17/30* (2006.01)
*G06F 15/00* (2006.01)
*G06Q 30/00* (2012.01)

(52) U.S. Cl. ...... 707/741; 707/771; 712/300; 705/14.51
(58) Field of Classification Search ................ 707/3, 7; 712/300; 455/456.3
See application file for complete search history.

(56) References Cited

U.S. PATENT DOCUMENTS

| | | | | |
|---|---|---|---|---|
| 5,717,392 A * | 2/1998 | Eldridge | ............... | 340/996 |
| 5,745,890 A * | 4/1998 | Burrows | ............... | 707/3 |
| 6,266,608 B1 * | 7/2001 | Pertz | ............... | 701/200 |
| 6,978,419 B1 * | 12/2005 | Kantrowitz | ............... | 715/511 |
| 7,130,645 B2 * | 10/2006 | Llombart-Juan et al. | .. | 455/456.3 |
| 2002/0032680 A1 * | 3/2002 | Garber et al. | ............... | 707/3 |
| 2002/0087522 A1 * | 7/2002 | MacGregor et al. | ............... | 707/3 |
| 2002/0188599 A1 * | 12/2002 | McGreevy | ............... | 707/3 |
| 2004/0107046 A1 * | 6/2004 | Zink et al. | ............... | 701/207 |
| 2005/0228797 A1 * | 10/2005 | Koningstein et al. | ............... | 707/100 |
| 2006/0074751 A1 * | 4/2006 | Kline et al. | ............... | 705/14 |

OTHER PUBLICATIONS

Douglas et al., "PostgreSQL: A Comprehensive Guide to Building, Programming and Administering PostgreSQL Databasees", 2003, Sams Publishing, pp. 73-77, 79-80.*

Douglas et al., "PostgreSQL: A Comprehensive Guide to Building, Programming and Administering PostgreSQL Databases", 2003, Sams Publishing, pp. 73-77, 79-80.*

* cited by examiner

*Primary Examiner* — Michael Hicks
(74) *Attorney, Agent, or Firm* — Shook, Hardy & Bacon L.L.P.

(57) ABSTRACT

A method and system are provided for selecting advertisements for presentation to a user in response to a user search query. The system may include a keyword server for parsing the user search query and an index server for receiving the parsed search query. The index server may include an index of advertising phrases and pre-filtering components for comparing index entries to the parsed user search query in order to discard non-matching index entries and locate matching entries. The pre-filtering components may include either a phrase length pre-filtering component or a word hash pre-filtering component. The system may additionally include a listing server for sorting through the matching entries located by the index server and further filtering the matching entries for retrieval and presentation to the user.

31 Claims, 6 Drawing Sheets

INVERTED INDEX 350

| First Word 352/LCID 354 | Array of listing ID's per word 356 | | | | | | | |
|---|---|---|---|---|---|---|---|---|
| Abba/1033 | 3029 match: epb words: 2 chars: 10 | → | 1321 match: e words: 1 chars: 4 | → | 2045 match: p words: 1 chars: 4 | Listing ID's |
| Abacus/1033 | 1023 match: p words: 1 chars: 6 | → | 5 4 match: epb words: 2 chars: 12 | → | 230 match: epb words: 2 chars: 14 | Listing ID's |
| Abalone/1033 | 2098 match: epb words: 2 chars: 10 | → | 6930 match: e words: 1 chars: 7 | → | 984 match: epb words: 2 chars: 18 | Listing ID's |
| Abandon/1033 | 398 match: epb words: 1 chars: 7 | → | 3 match: p words: 1 chars: 7 | → | 259 match: epb words: 3 chars: 23 | Listing ID's |
| Abc/1033 | 450 match: epb words: 4 chars: 19 | → | 395 match: epb words: 1 chars: 3 | → | 103 match: p words: 1 chars: 3 | Listing ID's |
| Abdomen/1033 | 4958 match: e words: 1 chars: 7 | → | 8483 match: epb words: 1 chars: 7 | → | 343 match: epb words: 1 chars: 7 | Listing ID's |

| INVERTED INDEX 350 | | | | | | | |
|---|---|---|---|---|---|---|---|
| First Word 352/LCID 354 | Array of listing ID's per word 356 | | | | | | |
| Abba/1033 | 3029 | match: epb<br>words: 2<br>chars: 10 | 1321 | match: e<br>words: 1<br>chars: 4 | 2045 | match: p<br>words: 1<br>chars: 4 | Listing ID's |
| Abacus/1033 | 1023 | match: p<br>words: 1<br>chars: 6 | 54 | match: epb<br>words: 2<br>chars: 12 | 230 | match: epb<br>words: 2<br>chars: 14 | Listing ID's |
| Abalone/1033 | 2098 | match: epb<br>words: 2<br>chars: 10 | 6930 | match: e<br>words: 1<br>chars: 7 | 984 | match: epb<br>words: 2<br>chars: 18 | Listing ID's |
| Abandon/1033 | 398 | match: epb<br>words: 1<br>chars: 7 | 3 | match: p<br>words: 1<br>chars: 7 | 259 | match: epb<br>words: 3<br>chars: 23 | Listing ID's |
| Abc/1033 | 450 | match: epb<br>words: 4<br>chars: 19 | 395 | match: epb<br>words: 1<br>chars: 3 | 103 | match: P<br>words: 1<br>chars: 3 | Listing ID's |
| Abdomen/1033 | 4958 | match: e<br>words: 1<br>chars: 7 | 8483 | match: epb<br>words: 1<br>chars: 7 | 343 | match: epb<br>words: 1<br>chars: 7 | Listing ID's |

FIG. 6

SYSTEM AND METHOD FOR INDEXING AND PREFILTERING

CROSS-REFERENCE TO RELATED APPLICATIONS

None.

STATEMENT REGARDING FEDERALLY SPONSORED RESEARCH OR DEVELOPMENT

None.

TECHNICAL FIELD

Embodiments of the present invention relate to indexing and pre-filtering information. In particular, embodiments of the invention relate to selecting advertisements using particular indexing and pre-filtering techniques in response to a user search query.

BACKGROUND OF THE INVENTION

The rate of growth of e-commerce sales has far eclipsed the rate of growth of retail sales in recent years. As e-commerce sales continue to expand, online marketing also expands. Marketing techniques aimed at Internet searchers have become popular because they provide the ability to connect advertisers directly to consumers searching for related products.

Currently, advertisers have the capability to purchase a variety of online marketing products. Advertisers may bid in an auction or pay a set amount to an online service in order to have their advertisements displayed in response to specific search phrases entered through a user browser. As Internet searchers implement a search engine and type in a query, a delivery engine supplied by the online service is responsible for matching the user and his or her query with one or more advertisements in accordance with an advertiser bid.

To date, delivery engines have implemented a limited number of search and retrieval techniques to locate appropriate advertisement matches in response to a user query. The techniques are generally expensive, as they require the delivery engine to sort through a large number of entries in order to locate the most appropriate advertisements. Accordingly, a solution is needed that quickly and efficiently locates and serves appropriate advertisements matching a user query.

BRIEF SUMMARY OF THE INVENTION

Embodiments of the present invention are directed to a delivery system for selecting advertisements for presentation to a user in response to a user search query. The system includes a keyword server for parsing the user search query and an index server for receiving the parsed search query. The index server includes an index of advertising phrases and pre-filtering components for comparing index entries to the parsed user search query in order to discard non-matching index entries and locate matching entries. The delivery system further includes a listing server for sorting through the matching entries located by the index server and further filtering the matching entries for retrieval and presentation of associated advertisements to the user.

In an additional aspect of the invention, a method is provided for selecting advertisements for presentation to a user based on an input user query. The method includes arranging index entries corresponding to advertiser phrases in an index, wherein the index entries are sorted by a first word of each corresponding advertiser phrase, and storing metadata in each index entry relevant to each corresponding advertiser phrase. The method additionally includes traversing the index to compare each index entry to an input user search request to eliminate non-matching index entries. The method also includes pre-filtering each matching index entry based on the stored metadata pertaining to the advertiser phrase.

In yet an additional aspect of the invention, a method is provided for processing an input user search request in order to produce content matching the user search request. The method includes parsing the user search request for demographic information and individual words and traversing an index of content entries to match each individual word and the demographic information with any appropriate content entries. The method additionally includes passing the content entries to a pre-filtering component and pre-filtering the passed content entries based on a comparison between metadata of the content entries and the user search request and passing any matching content entries to an additional component that further limits matching content entries.

BRIEF DESCRIPTION OF THE DRAWINGS

The present invention is described in detail below with reference to the attached drawings figures, wherein:

FIG. 6 illustrates an inverted index in accordance with an embodiment of the invention;

DETAILED DESCRIPTION OF THE INVENTION

I. System Overview

Figure 1:
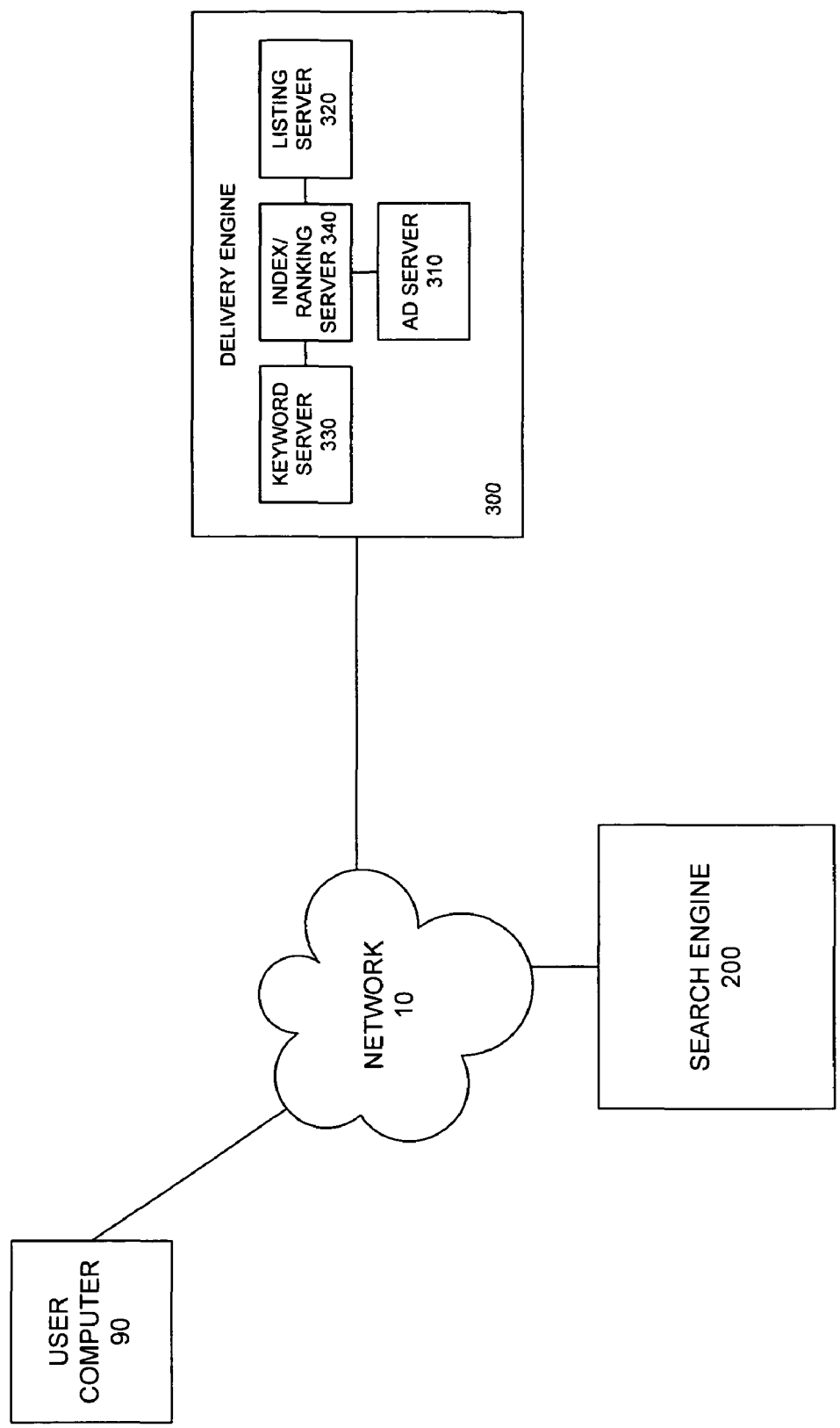
FIG. 1 is a block diagram illustrating a system for indexing and pre-filtering in accordance with an embodiment of the invention.

Embodiments of the invention include a method and system for indexing and pre-filtering content, such as advertisements, in order to select matching advertisements for presentation to a user in response to a user query. In operation, a user computer 90 utilizes a browser through which a user may enter search terms. The user computer 90 may be connected over a network 10, such as the Internet, with a search engine 200. A delivery engine 300 may also be connected over the network 10. The delivery engine 300 may include an advertisement server 310, a listing server 320, a keyword server 330, and an index and ranking server 340.

Users typically implement a user browser accessible to the user computer 90 to perform Internet searches through the search engine 200. In response to query entered through the user computer 90, the delivery engine 300 implements components responsible for matching the user query with the highest value advertisement possible. The keyword server 330 processes the search terms input through the user computer 100 and the index and ranking server 340 includes an inverted index that quickly matches incoming requests to potentially matching advertisements from the advertisement server 310. In embodiments of the invention, the inverted index may include branches keyed off a combination of the first word of an advertiser's purchased phrase and a Linguistic Locale ID (LCID) of the user whose search is being bid upon. For example, if an advertiser bids on the phrase "Sony Vaio", the bid will be entered with the key of "1033-Sony", where 1033 is the Lingustic LCID for the United States. The index and ranking server 340 may also be responsible for pre-filtering as many advertiser bids as possible for each incoming request in order to limit the number of listings that the listing server 320 is required to filter. The index and ranking server 340 may implement any number of types of pre-filtering techniques including phrase length pre-filtering and word hash pre-filtering. These techniques will be further described below.

II. Exemplary Operating Environment

Figure 2:
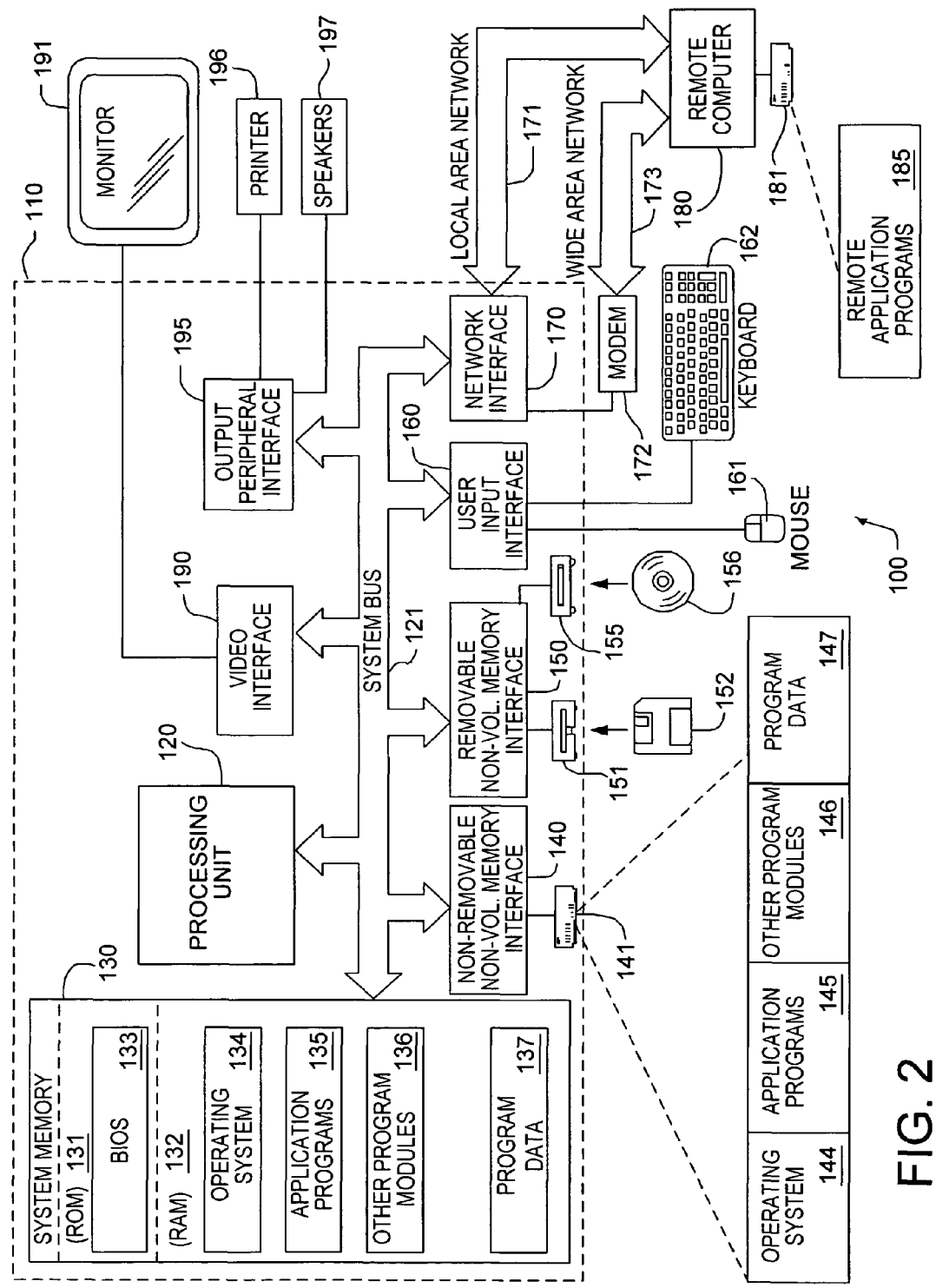
FIG. 2 is a block diagram illustrating a computerized environment in which the indexing and pre-filtering system may be implemented.

FIG. 2 illustrates an example of a suitable computing system environment 100 on which the indexing and pre-filtering system may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137. The transparency simulation and detection system 10 may be stored in any of the aforementioned memory structures.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Indexing and Pre-Filtering System and Method

As set forth above, embodiments of the invention include a method and system for indexing and pre-filtering content in order to select matching content from a content source for presentation to a user in response to a user query. In particular, in the embodiments described more fully herein, the system and method index and pre-filter advertisements from an advertisement server for presentation to a user in response to a user query. In operation, a user computer 90 includes a browser through which a user may enter search terms. The user computer 90 may be connected over the network 10 such as the Internet with a search engine 200. The delivery engine 300, also connected over the network 10, may include an advertisement server 310, a listing server 320, a keyword server 330, and an index and ranking server 340.

The delivery engine 300 serves content such as advertisements that may be displayed to the user through the user browser in response to the user's search query. The listing server 320 filters out content that is not relevant to the user or the user's query. As will further be explained below, the keyword server 330 and index and ranking server 340 work to limit the number of advertisements to be considered by the listing server 320 in order to simplify the task of the listing server 320. The content may be related to advertiser bids and the listing server 320 may be configured to filter out unqualified advertiser bids that are not sufficiently relevant to a user query. The advertisement server 310 may be configured to retrieve properly formatted advertisements from an advertisement source.

In operation, the user enters a query at the user computer 90 including one or more keywords to be searched by the search engine 200. In response to query entered through the user computer 90, the delivery engine 300 utilizes its components to match the user query with relevant advertisements. The keyword server 330 and the index and ranking server 340 are provided in order to simplify the task of the listing server 320. In embodiments of the invention, the keyword server 330 and the index and ranking server 340 operate to pre-filter unqualified content, so that the listing server will have fewer listings to consider.

Figure 3:
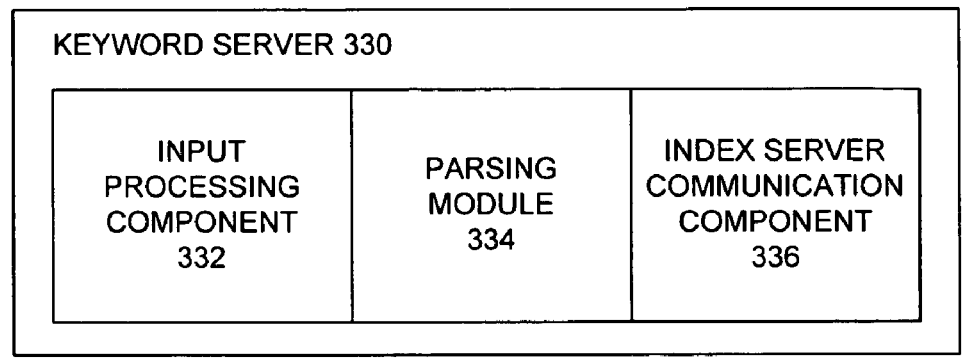
FIG. 3 is a block diagram illustrating a keyword server in accordance with an embodiment of the invention.

The keyword server 330 processes the search terms input through the user computer 90. More specifically, the keyword server 330 parses the search to identify each distinct word and the LCID of the searcher. As illustrated in FIG. 3, the keyword server 330 includes an input processing component 332 for receiving a query and a parsing module 334 for parsing the received query for demographic information. After the keyword server 330 has parsed the received query by implementing the parsing module 334, the keyword server 330 communicates the parsed information to the index and ranking server 340 using an index server communication component 336. For instance, if the keyword server 330 receives a request of "red flannel shirt", the keyword server 330 parses the request into its component words "red", "flannel" and "shirt".

Figure 4:
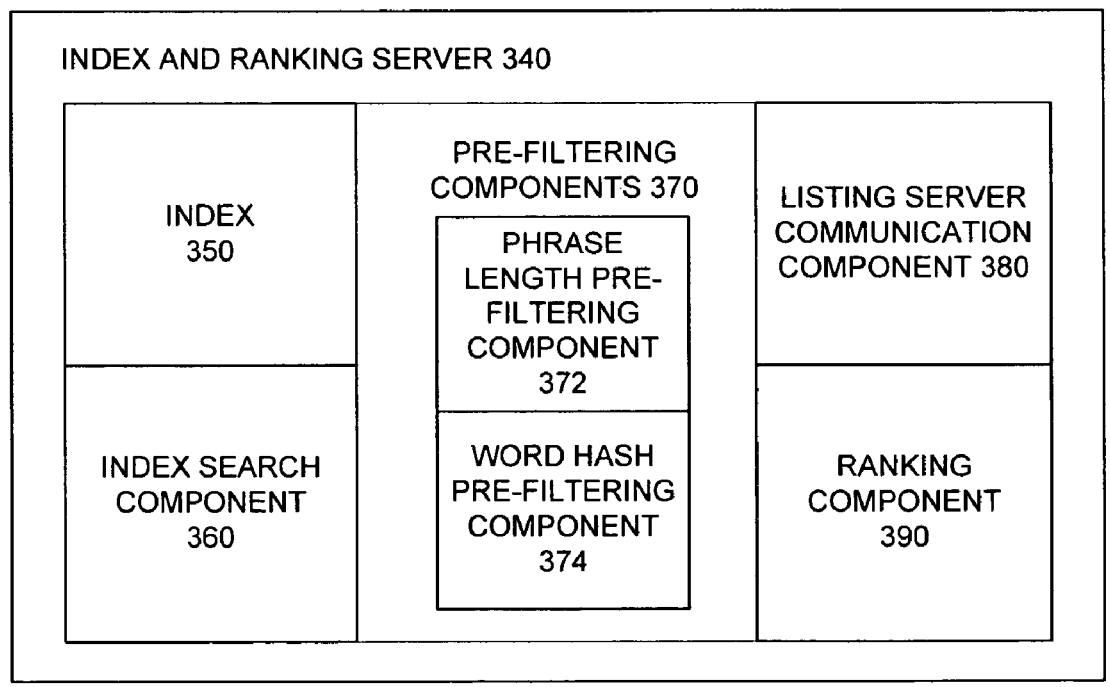
FIG. 4 is a block diagram illustrating an index and ranking server in accordance with an embodiment of the invention.

Components of the index and ranking server 340 are illustrated in FIG. 4. The index and ranking server 340 may include an index 350, an index search component 360, pre-filtering components 370, a listing server communication component 380, and a ranking component 390. The index and ranking server 340 may be responsible for pre-filtering as many advertiser bids as possible for each incoming request in order to limit the number of listings that the listing server 320 will subsequently be required to filter.

The index 350 may be or include an inverted index that allows for rapid matching of incoming requests to advertisements from the advertisement server 310. The index 350 associates metadata with each leaf node that corresponds to one listing. In embodiments of the invention, the metadata may include for example, the number of words in the advertiser's purchased phrase, the number of characters, or other characteristics of the advertiser's purchased phrase. The inverted index 350 may include branches keyed off a combination of the first word of an advertiser's purchased phrase and a LCID of the user whose search is being bid upon. For example, if an advertiser bids on the phrase "Sony Vaio", the bid will be entered in the index 350 with the key of "1033-Sony", where 1033 is the Lingustic LCID for the United States. Each branch will have as many leaves associated with it, as there are bids with the same first word and LCID combination. For example, if two bids exist, "Sony Vaio" and "Sony Alternatives", and both are targeted in the United States, then there will be one leaf node for the "Sony Vaio" bid and one leaf node for the "Sony Alternative" bid, both keyed off of the "Sony-1033" branch.

As is further illustrated in FIG. 6, the index 350 may be an inverted index and may be structured alphabetically based on a first word 352 and LCID 354. FIG. 6 illustrates an exemplary portion of such an index including an array 356 of listing identifiers per word.

The index search component 360 may traverse the index 350 based on a user query entered through the user computer 90. The index search component 360 may examine each word of a user input query as a "first word" and may pass listings having a matching first word to the pre-filtering components 370, as will be further explained below. Using the previous example of "red flannel shirt", the index search component 360 may compare each of "red", "flannel" and "shirt" to the index and obtain listing identifiers that begin with any one of these words.

The pre-filtering components 370 may include a phrase-length pre-filtering component 372 and a word hash pre-filtering component 374. The pre-filtering components 370 may evaluate the terms contained within the index 350, and more specifically, in embodiments of the invention, the first word matches passed by the index search component 360.

Phrase length pre-filtering as performed by the phrase length pre-filtering component 372 entails filtering out advertiser bids that are too long or have too many words to be a possible match to the user request. Advertisers may place at least three different kinds of bids on search phrases including a bid for an exact match, a phrase match, or a broad match.

In order for the pre-filtering components 370 to find an exact match, the user search query is contained in its entirety within the phrase on which the advertiser has bid. If a listing is for exact matches only, successful matches will occur when looking up the first word of the user search phrase. If a listing is for exact matches only, the listing phrase must have at least as many characters and words as the input query. Furthermore, every word in the user search phrase must be looked up in the index 350.

In order for a phrase match to occur, the advertiser phrase can be a sub-string of the input user search phrase. For instance, if the user searches for "BMW dealers in Chicago" and the advertiser bids on "BMW dealers" as a phrase match, the pre-filtering components 370 will find a match. Accordingly, if an advertiser has a listing for a phrase match, the user search phrase from the point of the current word forward must have at least as many words and characters as are in the advertiser listing phrase. For example, if the advertiser phrase includes three words and the user search entry has less than three words, no match will be found.

The pre-filtering components 370 may find a broad match if the advertiser bid merely requires that all of the words in the advertiser bid appear somewhere in the user search phrase. For instance, if the user searches for "BMW dealers in Chicago" and the advertiser bids on "Chicago BMW" as a broad match, the pre-filtering components 370 will find a match. If a listing is for broad match, the user search phrase must have at least as many words and characters as are in the advertiser listing phrase. All of the aforementioned type of matches have been described as phrase length matches and are evaluated by the phrase length pre-filtering component 372.

Figure 7:
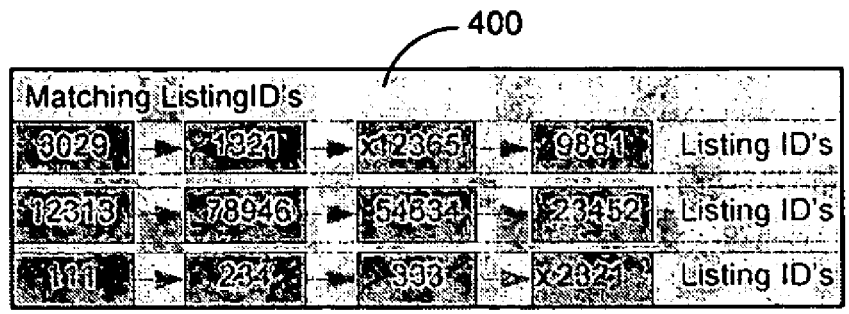
FIG. 7 illustrates a list of matches in accordance with an embodiment of the invention.
Figure 8:
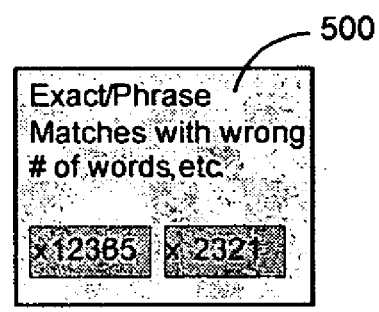
FIG. 8 illustrates a sample list of discarded identifiers.

Accordingly, after the index search component 360 passes on the matching listing IDs 400 as shown in FIG. 7 to the pre-filtering components 370, the phrase length pre-filtering component 372 filters out the mismatches 500 that have the wrong number of words or other mismatch criteria.

The pre-filtering components 370 may, as an alternative to the phrase length filtering, implement the word hash pre-filtering component 374. The word hash pre-filtering component 374 performs word hash pre-filtering that entails filtering out advertiser bids where the words in the phrase purchased by the advertiser are not present in the user search phrase. To facilitate word hash pre-filtering, the index 350 stores an array of one-byte hashes in every listing or leaf node, where each byte is a hash of a word in the advertiser's purchased phrase.

For example, if the advertiser bids on the phrase "Toshiba laptop sale", the entry in the index for this bid will have an array with a one-byte hash for each word in the phrase except for the first word. The first word may be used as an index key for the index 350. In this instance, the index 350 stores a one-byte hash for "laptop" and a one byte hash for "sale". If, for example, a user searches for the phrase "Toshiba laptop price", the word hash pre-filtering component 374 can rapidly determine that even though the user search phrase and the advertiser's purchased phrase share the same first two words, the third words "price" and "sale" will have hashes that are not equivalent. Accordingly, the word hash pre-filtering component 374 filters the listing.

Any number of different known hashing algorithms may be suitable for use in creating the index 350. One exemplary algorithm is shown below:

```
byte hashWord(string word)
{
    byte result = 0;
    int i = 0;
    for each character in word
    {
        result = result + character*2^i;
    }
    return result;
}
```

The function illustrated above is quick and effective, and takes the position of characters in the word into account so that words having the same characters in different positions will not be treated identically.

Figure 5:
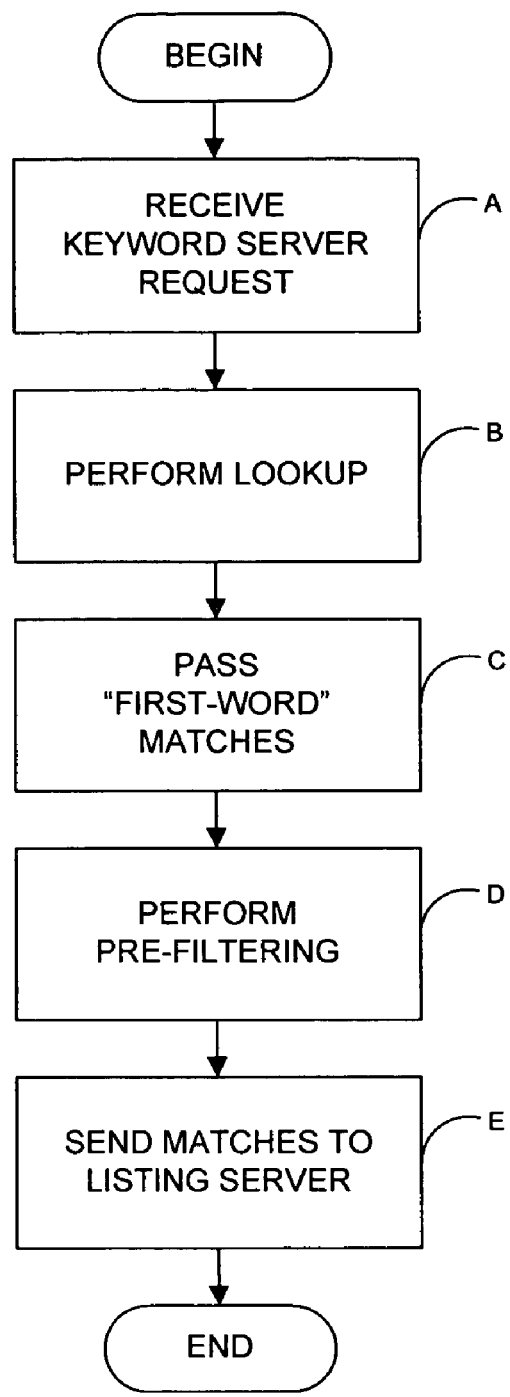
FIG. 5 is a flow chart illustrating a method for retrieving advertisements in accordance with embodiments of the invention.

FIG. 5 is a flow chart illustrating a generalized method for finding matching content in accordance with embodiments of the invention. After the keyword server 330 receives a user search query and parses the user search query, the keyword server 330 passes the parsed request to the index and ranking server 340. In step A, the index and ranking server 340 receives the keyword server request. In step B, the index search components 360 search the index 350 of the index and ranking server 340 and pass first word matches to the pre-filtering components 370 in step C. In step D, the pre-filtering components 370 operate on the first word matches to further filter out unqualified content based on mismatched phrase length or word hashes, depending upon the type of pre-filtering component used. In step E, the pre-filtering components 370 pass the matches to the listing server 320 so that it can further narrow selected matches for display to the user.

The indexing and pre-filtering system of the invention may accommodate many different advertisers or content servers. The pre-filtering components 370 attempt to filter out as many choices as possible. The indexing and pre-filtering system eliminates entries that cannot match based on the criteria explained above. The indexing and pre-filtering system may narrow one hundred choices down to five. Subsequently, the listing server will only be required to select matches from five entries.

Although the system described above is illustrated as comparing advertiser phrases to user searches, the system may also be used to search contextual content on third-party websites. Thus, while advertisers bid on user search phrases in the search product, advertisers may also be bidding on phrases present in web page text in the contextual product.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A delivery system for selecting advertisements for presentation to a user in response to a user search query, the system comprising: a keyword server for parsing the user search query, wherein the keyword server parses the user search query into individual word components and locates a linguistic locale identifier of the user search query; an index server for receiving the parsed search query, the index server comprising: an inverted index of advertising phrases and corresponding linguistic locale identifiers purchased by advertisers and sorted by a first word of each of the advertising phrases and related linguistic locale identifier, the inverted index storing metadata that includes advertiser phrase length in number of characters and advertiser phrase length in number of words in each index entry relevant to each corresponding purchased advertiser phrase, and pre-filtering components for comparing the advertising phrases purchased by the advertisers to each individual word component of the parsed user search query to discard non-matching advertising phrases purchased by the advertisers and locate matching advertising phrases purchased by the advertisers based on the stored metadata pertaining to the advertiser phrase; a listing server for sorting through the matching linguistic locale identifiers and advertising phrases purchased by the advertisers located by the index server and further filtering the matching entries for retrieval and presentation of associated advertisements to the user; and an advertisement server for retrieving, from an advertisement source, advertisements corresponding to the purchased advertising phrases sorted and filtered by the listing server.

2. The delivery system of claim 1, further comprising a phrase length pre-filtering component for comparing a phrase length of an index entry with a phrase length of the user search query.

3. The delivery system of claim 2, wherein the phrase length pre-filtering component compares the phrase length of the user search query with an exact match index entry and filters out the exact match index entry if the exact match index entry has fewer characters than the user search query.

4. The delivery system of claim 2, wherein the phrase length pre-filtering component compares the phrase length of the user search query with a broad match index entry and filters out the broad match index entry if the user search query has fewer characters than the broad match index entry.

5. The delivery system of claim 2, wherein the phrase length pre-filtering component compares the phrase length of the user search query with a phrase match index entry and filters out the phrase match index entry if the user search query from a point of a matching word forward has fewer characters than the phrase match index entry.

6. The delivery system of claim 1, wherein the index of advertising phrases is alphabetically arranged according to a first word of each advertising phrase and each index entry includes a hash of each subsequent word in the advertising phrase for each index entry.

7. The delivery system of claim 6, further comprising a word hash pre-filtering component for comparing a hash of an index entry with the user search query when the first word of the index entry matches the user search query.

8. The system of claim 1, wherein the inverted index of advertising phrases includes a branch for each distinct combination of first word and accompanying linguistic locale identifier.

9. The system of claim 8, wherein a next word of each advertiser phrase is represented by a leaf node attached to an appropriate branch.

10. A computer-implemented method for selecting advertisements for presentation to a user based on an input user query, the method comprising:
implementing a parsing component for parsing the input user query into individual word components and locating a linguistic locale identifier of the input user query;
arranging index entries corresponding to purchased advertiser phrases in an inverted index, wherein the index entries are sorted by a first word of each corresponding purchased advertiser phrase and related linguistic locale identifier, and storing metadata that includes advertiser phrase length in number of characters and advertiser phrase length in number of words in each index entry relevant to each corresponding purchased advertiser phrase;
traversing the inverted index to compare each index entry to an input user search request to eliminate non-matching index entries;
pre-filtering each matching index entry based on the stored metadata pertaining to the corresponding advertiser phrase;
processing advertiser bids to extract advertiser preferences associated with the corresponding advertiser phrase, and
selecting, for presentation to the user, advertisements associated with the corresponding advertiser phrase that relate to the input user query in accordance with the advertiser preferences.

11. The method of claim 10, further comprising implementing a phrase length pre-filtering component for comparing a phrase length of each matching index entry with a phrase length of the input user query.

12. The method of claim 11, further comprising implementing the phrase length pre-filtering component to compare the phrase length of the input user query with an exact match index entry and filter out the exact match index entry if a phrase of the exact match index entry has fewer characters than the input user query.

13. The method of claim 11, further comprising implementing the phrase length pre-filtering component to compare the phrase length of the input user query to a broad match index entry and filter out the broad match index entry if the input user query has fewer characters than the broad match index entry.

14. The method of claim 11, further comprising implementing the phrase length pre-filtering component to compare the phrase length of the input user query with a phrase match index entry and filter out the phrase match index entry if the input user query from a point of a matching word forward has fewer characters than the phrase match index entry.

15. The method of claim 10, further comprising arranging the index entries, corresponding to advertiser phrases, alphabetically according to the first word of each advertiser phrase.

16. The method of claim 15, further comprising including a hash of each subsequent word in the advertiser phrase with each index entry.

17. The method of claim 16, further comprising a implementing a word hash pre-filtering component for comparing the hash of an index entry with the input user query when the first word of the index entry matches the input user query.

18. The method of claim 10, further comprising providing an inverted index having a branch for each distinct first word of a set of advertiser phrases and accompanying linguistic locale identifier.

19. The method of claim 18, further comprising providing a leaf node attached to the branch to represent a next word of each advertiser phrase.

20. A computer readable medium storing computer executable instructions for performing the method of claim 10.

21. A method for processing an input user search request in order to produce content matching the user search request, the method comprising:
parsing the user search request for demographic information and individual words;
traversing an inverted index of content entries to match each individual word and the demographic information with any appropriate content entries and pass the content entries to a pre-filtering component;

pre-filtering the passed content entries based on a comparison between metadata of the content entries and the user search request and passing any matching content entries to an additional component that further limits matching content entries in accordance with advertiser bids associated with each content entry to generate a listing of content, wherein the advertiser bids limit matching content entries by returning content entries that are one of an exact match, a phrase match, or a broad match; and formatting the listing of content for display.

22. The method of claim 21, further comprising implementing a phrase length pre-filtering component for comparing a phrase length of each matching content entry with a phrase length of the user search request.

23. The method of claim 22, further comprising implementing the phrase length pre-filtering component to compare the phrase length of the user search request with an exact match content entry and filter out the exact match content entry if a phrase of the exact match content entry has fewer characters than the user search request.

24. The method of claim 22, further comprising implementing the phrase length pre-filtering component to compare the phrase length of the user search request to a broad match content entry and filter out the broad match content entry if the user search request has fewer characters than the broad match content entry.

25. The method of claim 22, further comprising implementing the phrase length pre-filtering component to compare the phrase length of the user search request with a phrase match content entry and filter out the phrase content entry if the user search request from a point of a matching word forward has fewer characters than the phrase match content entry.

26. The method of claim 21, further comprising arranging the index of content entries alphabetically according to a first word of each content entry.

27. The method of claim 26, further comprising including a hash of each subsequent word in the content entry with each content entry.

28. The method of claim 27, further comprising a implementing a word hash pre-filtering component for comparing the hash of the content entry with the user search request when the first word of the content entry matches the user search request.

29. The method of claim 21, further comprising providing an inverted index having a branch for each distinct combination of a first word of a set of content entries and accompanying linguistic locale identifier.

30. The method of claim 29, further comprising providing a leaf node attached to the branch to represent a next word of each content entry.

31. A computer readable medium storing computer executable instructions for performing the method of claim 21.

* * * * *

UNITED STATES PATENT AND TRADEMARK OFFICE
CERTIFICATE OF CORRECTION

| | | |
|---|---|---|
| PATENT NO. | : 8,214,369 B2 | Page 1 of 1 |
| APPLICATION NO. | : 11/007247 | |
| DATED | : July 3, 2012 | |
| INVENTOR(S) | : Brian Burdick et al. | |

It is certified that error appears in the above-identified patent and that said Letters Patent is hereby corrected as shown below:

On the Title page, Item (54), and in column 1, line 2, under "Title", delete "PREFILTERING" and insert -- PRE-FILTERING --, therefor.

On the Title page, Item (56), under "Other Publications" line 1-3, below "OTHER PUBLICATIONS" delete "Douglas et al., "PostgreSQL: A Comprehensive Guide to Building, Programming and Administering PostgreSQL Databasees", 2003, Sams Publishing, pp. 73-77, 79-80.".

Signed and Sealed this
Twenty-fifth Day of December, 2012

David J. Kappos
*Director of the United States Patent and Trademark Office*